United States Patent [19]
Decker

[11] Patent Number: 5,573,829
[45] Date of Patent: Nov. 12, 1996

[54] LAMINATED BOARD HAVING GYPSUM CORE AND WOOD VENEER LAMINATION WITH DEBOSSED DESIGNS

[75] Inventor: Dennis E. Decker, Landover, Md.

[73] Assignee: Pittcon Industries, a division of American Metal Forming Corporation, Bronx, N.Y.

[21] Appl. No.: 651,860

[22] Filed: Feb. 7, 1991

[51] Int. Cl.⁶ .............................. B32B 3/30; B32B 13/06; B32B 13/10
[52] U.S. Cl. .................. 428/156; 428/137; 428/138; 428/151; 428/161; 428/172; 428/165; 428/171; 428/464; 428/471; 428/537.1; 428/537.7; 428/703; 428/904.4; 156/39; 156/45; 156/40; 156/219
[58] Field of Search ..................... 428/137, 138, 428/151, 156, 161, 172, 165, 171, 464, 471, 537.1, 537.7, 703, 904.4; 156/39, 45, 40, 219

[56] References Cited

U.S. PATENT DOCUMENTS

| | | | |
|---|---|---|---|
| 1,433,077 | 10/1922 | Hansen | 428/136 |
| 1,871,843 | 8/1932 | Ericson | 156/45 |
| 1,943,663 | 1/1934 | Ericson | 156/45 |
| 2,803,188 | 8/1957 | Duvall | 156/220 |
| 3,480,501 | 11/1969 | Burch | 156/228 |
| 3,630,817 | 12/1971 | Winkowski | 428/164 |
| 3,692,620 | 9/1972 | Schmidt et al. | 428/703 |
| 3,694,298 | 9/1972 | Veschuroff et al. | 156/219 |
| 3,793,125 | 2/1974 | Kunz | 428/211 |
| 3,846,219 | 11/1974 | Kunz | 428/326 |
| 4,007,076 | 2/1977 | Clarke et al. | 428/236 |
| 4,073,230 | 2/1978 | Akerson | 101/32 |
| 4,110,507 | 8/1978 | Colledge | 428/524 |
| 4,142,007 | 2/1979 | Lumpe et al. | 101/31 |
| 4,153,490 | 5/1979 | Werz et al. | 156/219 |
| 4,586,308 | 5/1986 | Jennings | 52/393 |
| 4,608,108 | 8/1986 | Goll | 156/219 |
| 4,631,097 | 12/1986 | Kossuth | 428/703 |
| 4,812,188 | 3/1989 | Hansen | 156/220 |
| 4,844,968 | 7/1989 | Persson et al. | 428/215 |
| 4,853,062 | 8/1989 | Gartland | 156/220 |
| 4,865,912 | 9/1989 | Mitsumata | 428/461 |

FOREIGN PATENT DOCUMENTS 1012254   12/1965   United Kingdom.

*Primary Examiner*—William Watkins
*Attorney, Agent, or Firm*—Pennie & Edmonds

[57] ABSTRACT

A wood veneer laminated gypsum board comprises a gypsum core and lamination of a paper or a paper-like outer layer on both sides, an aluminum backed wood veneer bonded to the paper outer layer, and debossed designs on the wood veneer which penetrates beyond the surface of the gypsum board. The wood veneer laminated gypsum board is formed by spraying or applying a mixture of adhesive diluted with liquid softening agent, which may include water or water mixed with other materials, on the aluminum side of the aluminum-backed wood veneer. The paper or paper-like outer covering is lightly sprayed or coated with the softening agent. The coated aluminum backed wood veneer is placed on the lightly coated the gypsum board. The wood veneer is moistened with water. The wood veneer and the gypsum board is pressed with application of heat for a predetermined period.

16 Claims, 8 Drawing Sheets

LAMINATED BOARD HAVING GYPSUM CORE AND WOOD VENEER LAMINATION WITH DEBOSSED DESIGNS

BACKGROUND OF THE INVENTION

1. Field of Invention

The present invention relates to a process for laminating a wood veneer to a gypsum board or drywall and impressing or debossing decorative patterns or designs into the wood veneer laminated gypsum board or drywall and relates to the product formed by the process.

2. Background of the Prior Invention

Several techniques have been proposed in the prior art for impressing or debossing decorative designs directly into gypsum board. Examples of the prior art techniques are disclosed in U.S. Pat. Nos. 1,871,843 and 1,943,663 to Ericson, 2,803,188 to Duvall, 3,630,817 to Winkowski, 4,007,076 to Clarke et al., 4,073,230 to Akerson, and 4,608,108 to Goll; and Great Britain Patent Publication No. 1,012,254.

More specifically, in one prior art technique, decorative impressions are debossed into the board while the core gypsum material is still in a plastic state during its initial manufacture as disclosed, for example, in U.S. Pat. Nos. 1,943,663 to Ericson and 4,608,108 to Goll. Experiences indicate that this technique is difficult to control because the core gypsum material hardens unevenly.

In another prior art technique a board or like material is debossed by wetting the board with a vaporized or vaporizable liquid agent such as steam or water or water soluble wetting solution and then heatpressing the wet board for a predetermined time, as disclosed, for example, in U.S. Pat. Nos. 1,871,843 to Ericson, 2,803,188 to Duvall, 4,007,076 to Clarke et al, and 4,073,230 to Akerson. In such a process, the steam or the water, which vaporizes into steam when heated during the debossing stage, is designed to enter the pores of the paper coat of the gypsum board and to plasticize its interior. The plasticization of the board permits decorative patterns to be debossed.

In another prior technique, an outer paperlike covering layer of a gypsum board is lightly debossed with a heated press without using steam or water, as disclosed in U.S. Pat. No. 4,110,507 to Colledge. A decorative pattern of wood grain is formed on the outer covering layer.

Yet in another prior technique, a water barrier layer of an acrylic film or the like material is formed on the board. Printing designs are debossed into the film covered board prior to the film fully setting as disclosed, for example, in U.S. Pat. Nos 3,630,817 to Winkowski.

Laminating a wood veneer and the like to a board or pre-debossed board, such as plywood and chip board and the like, is known, as disclosed, for example, in U.S. Pat. Nos. 4,853,062 to Gartland, 4,812,188 to Hansen, 4,844,968 to Persson et al., 4,142,007 to Lampe et al, and 3,846,219 and 3,793,125 to Kunz.

A use of a metallic foil as a separation layer in a laminated board is also disclosed, for example, in U.S. Pat. Nos. 3,793,125 to Kunz, and 4,153,490 to Werz et al. It is also known to bond an aluminum overlay with a wooden product before shaping the wooden product with a press, as disclosed, for example, in U.S. Pat. No. 3,480,501 to Burch.

None of these prior inventions, however, disclose a process for debossing a decorative wood veneer laminated gypsum board with printing designs; nor do they disclose a debossed wood veneer laminated gypsum board. Furthermore, none of these prior inventions disclose the use of a metallic layer between the wood veneer and the gypsum board to enable the wood veneer to be debossed without damaging the wood veneer during the debossing stage.

SUMMARY OF INVENTION

The wood veneer laminated gypsum board comprises a gypsum core having a paper or a paper-like outer layer on both sides, an aluminum backed wood veneer bonded to one side of the paper outer layer, although the aluminum backed wood veneer can be bonded to both sides, and designs debossed on the wood veneer which penetrate below the surface of the gypsum board.

The wood veneer laminated gypsum board is formed by spraying or applying a mixture comprising an adhesive diluted with a liquid softening agent, which may include water or water mixed with other materials, on the aluminum side of the aluminum-backed wood veneer. The paper or paper-like outer covering of the gypsum board is lightly sprayed or coated with a softening agent. The coated aluminum backed wood veneer is then placed on the lightly-coated gypsum board. A liquid is then applied to the wood veneer to moisten the wood. The wood veneer covered gypsum board is then pressed at appropriate levels of heat for a predetermined period.

Excellent results have been achieved by this process. In fact, the above process has resulted in 100% adhesion of the veneer layer to the gypsum outer paper, as well as a very clean and concise pattern being formed in the debossed wood veneer without tearing or bubbling of the wood veneer. Specifically, the application of heat during pressing, and following the penetration of the softening agent through the outer covering paper and into the gypsum core, vaporizes the softening agent. As a result, elasticity is provided to the board paper covering and to the gypsum core. The vaporized softening agent thus promotes stretching of the face paper and softening of the gypsum core when decorative patterns are impressed onto the board. The vaporization of the elasticity-promoting softening agent inside the gypsum board permits decorative patterns to be impressed or debossed into the gypsum substructure without impairing the integrity of the board product.

Similarly, the liquid applied to the wood veneer soaks through the wood to allow the wood to become elastic and thus promotes stretching during the debossing process. At the same time, the aluminum backing underlying the wood veneer prevents the wood from cracking or breaking. The stretching of the wood enables the wood veneer to be debossed with a very clean and concise pattern without tearing or bubbling.

The apparatus for carrying out the above process includes (1) a staging table with rollers onto which a group of stacked gypsum boards are received and transferred to (2) an adjustable feed station for selecting and moving the top board of the group to (3) a brushing station for removal of any dust or foreign matter from the board, (4) a disc conveyor which moves each board under a sprayer element for applying the softening agent to the board, (5) an aluminum backed wood veneer applying station, (6) a heating and pressing station to impress the decorative patterns into the board, and (7) a collection station to stack the processed boards into groups. Subsequent to processing, the boards may be cut to the required size.

An object of the present invention is to provide a process for debossing decorative designs and patterns onto a wood veneer outer layer formed on a gypsum board.

A further object of this invention is to provide a process for debossing decorative designs and patterns onto a gypsum board having an aluminum-backed wood veneer outer layer.

A further object of this invention is to provide a debossed wood veneer covered gypsum board using the above process.

DETAILED DESCRIPTION OF THE INVENTION

The gypsum boards, for example a board known as FIRESHIELD-G manufactured by Gold Bond Building Products Co., Inc., are generally processed in standard commercial sizes. The core material is a gypsum product, which may include glass or mineral fibers. The board is coated on each side with a protective paper or paper-like layer.

Figure 1:
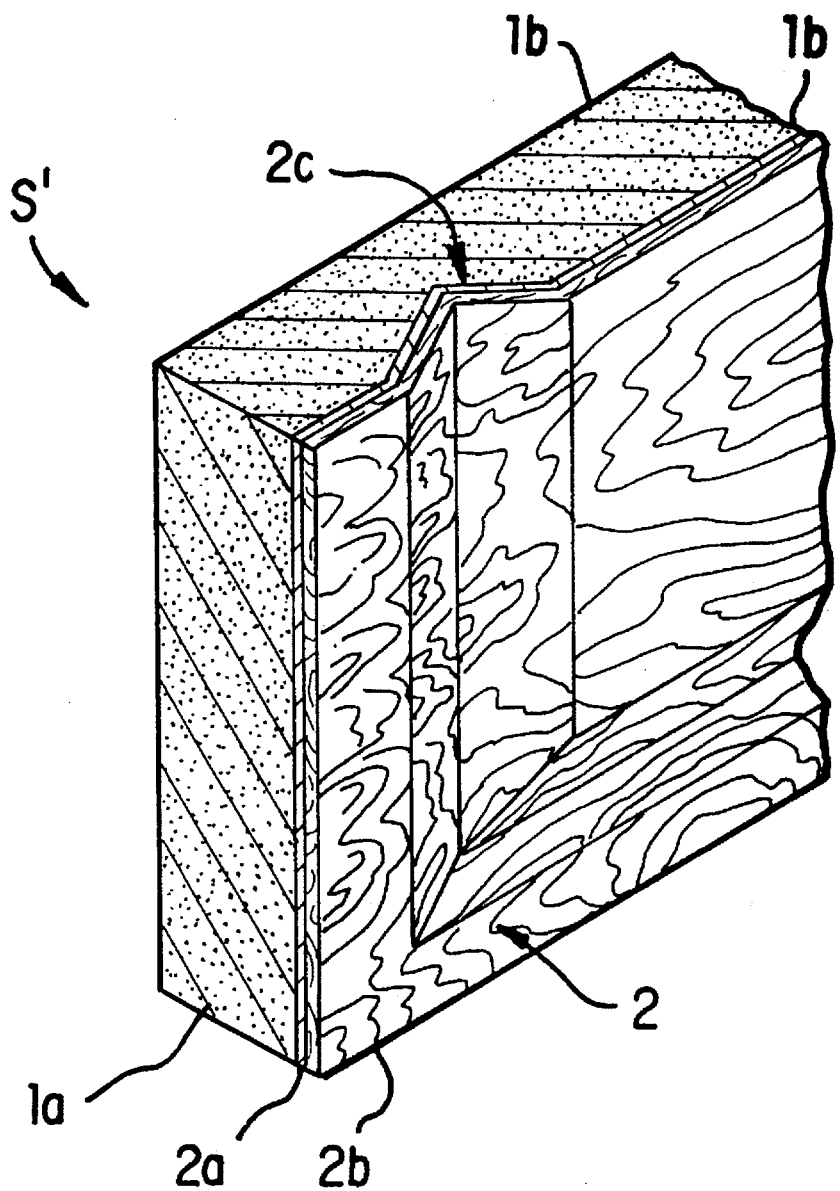
FIG. 1 is a cross-sectional view of the present laminated gypsum board.

As illustrated in the cross-sectional view, FIG. 1, a debossed aluminum backed wood veneer board S'comprising a gypsum core 1a, an outer paper or paperlike layer 1b covering both sides of the core, and an aluminum backed wood veneer 2 bonded to the outer paper layer. The aluminum backed wood veneer 2 comprises an aluminum foil 2a bonded to a wood veneer 2b in a conventional manner using an adhesive under heat and pressure as disclosed, for example, in Canadian Patent No. 701,021. The debossed area 2c, as illustrated in FIG. 1, is an area where the aluminum backed wood veneer is impressed beyond the surface of the core 1a.

Figure 1B:
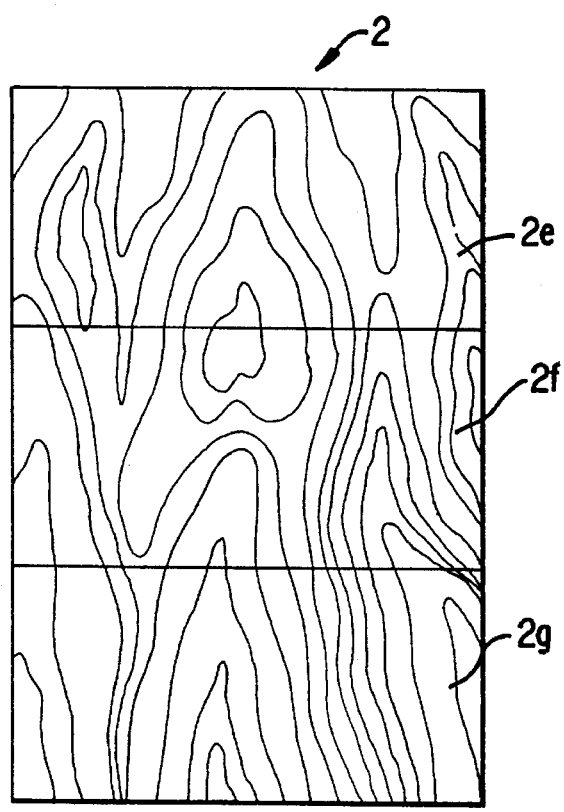
Fig. 1b shows the wood side of the aluminum laminated wood veneer which is presliced into sections.
Figure 1A:
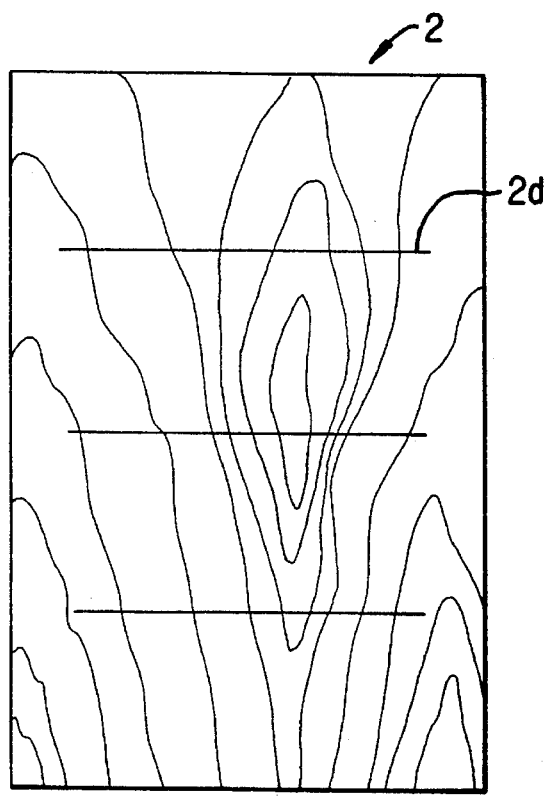
Fig. 1a shows the wood side of the aluminum laminated wood veneer provided with air bubble venting slits.
Figure 1C:
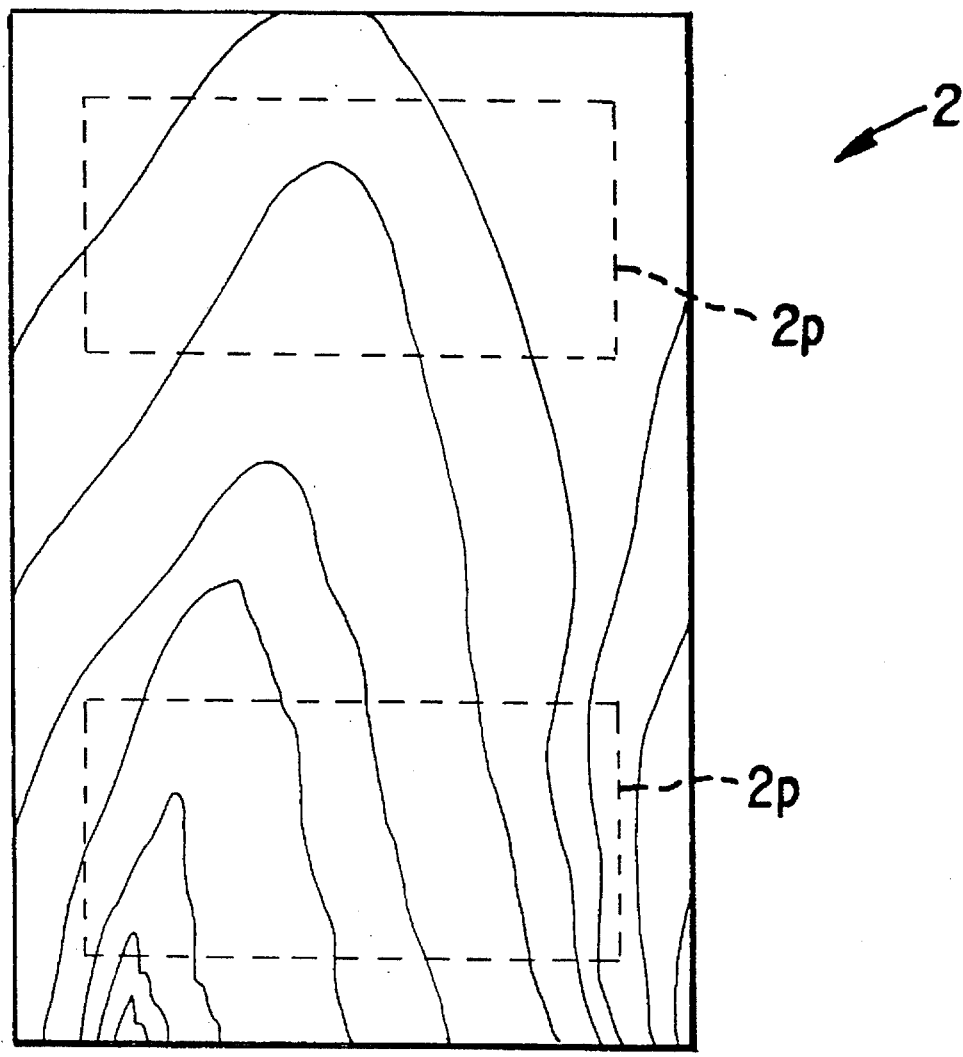
Fig. 1c shows the wood side of the aluminum laminated wood veneer provided with air bubble venting perforations.

Fig. 1a graphically illustrates an aluminum backed wood veneer sheet 2 provided with air bubble venting slits 2d, however many needed. Alternatively, as shown in Fig. 1b, the veneer sheet 2 can be presliced into sections 2e, 2f, 2g, however many needed, or perforated 2p, as shown graphically in Fig. 1c. The veneer sheet can be provided with slits or perforations or can be presliced into segments to enable the release of any trapped air between the veneer and the gypsum face during the debossing stage. The perforations, slits or cuts are to be made so as to be compatible with, and not detract from, the appearance of the finished product. Figs. 1a and 1b are shown with three lateral slits and two cuts, respectively, because of the desire to ultimately cut the board into pieces suitable, for example, for wainscotting. If the sheets are to be divided into two equal halves or into uneven pieces, only a single lateral slit or cut would be needed. Also, if the sheet is to be used without cutting, the perforations instead would be discreetly placed to enable venting of the air bubbles without detracting from the appearance of the finished product. It should be kept in mind that the cuts, slits or perforations are placed so as to be obscured by the following debossing operation or with the desired panel sizing in mind. Also, the slits, perforations, etc., are preferably made along the line of the wood grain to disguise or blend the cuts with the wood grain.

Figure 2:
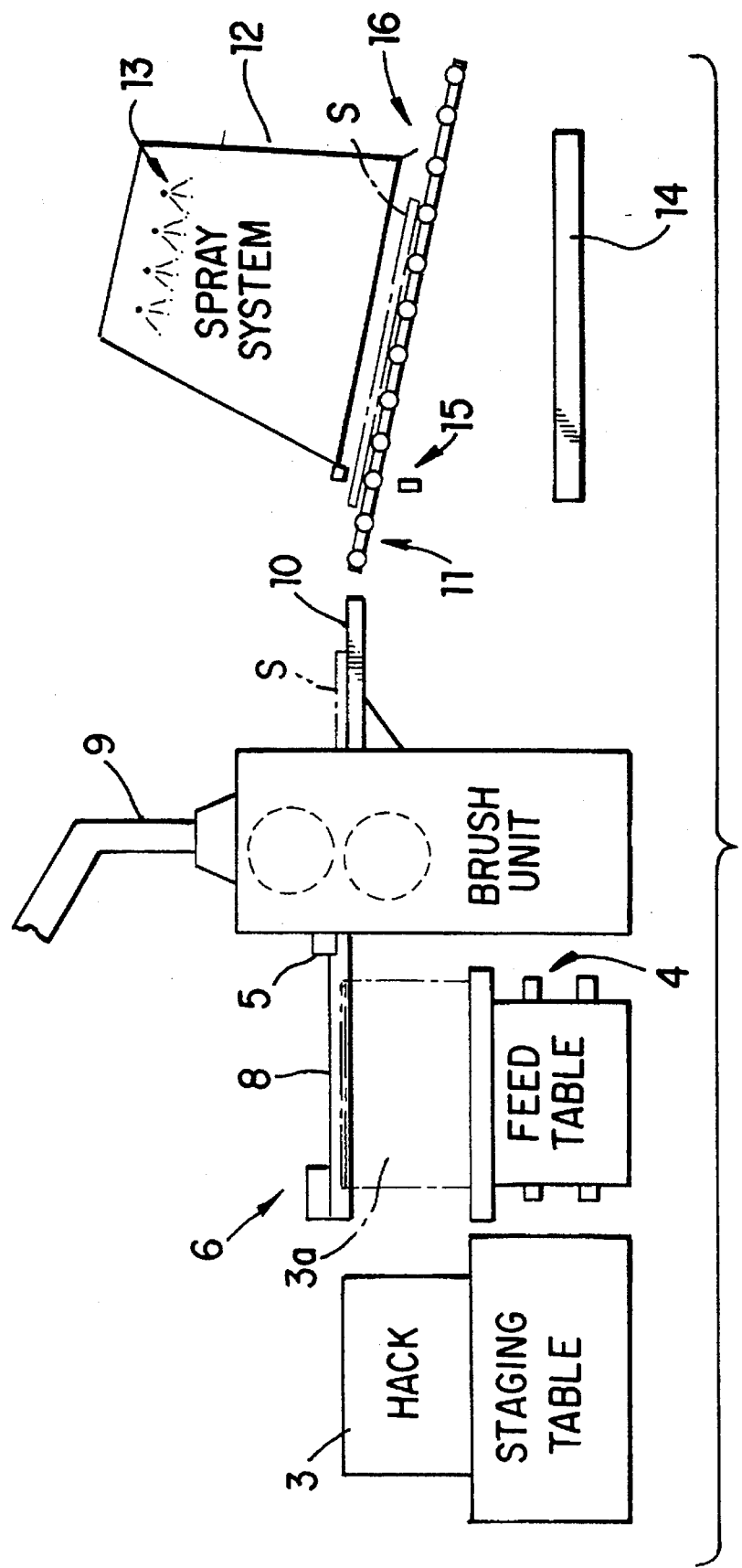
FIG. 2 is a diagrammatic view of the staging, initial feed, brushing, and spraying apparatus used in the invention.

To produce a laminated gypsum board having the aluminum backed wood veneer, a commercially-available drywall product is staged on a table with rollers, indicated as the staging table in FIG. 2. The product is staged in units typically containing 44 boards. Each such unit is designated as hack 3. The hack is transferred from the staging table to the feed table as shown by the phantom hack 3a in FIG. 2. The feed table is mounted on a scissors lift 4 for elevating the table so that individual boards S in the hack may be removed in succession and fed into the brush unit. The scissors lift 4 is operated by a sensor 5, preferably a photoelectric sensor or the like, as diagrammatically depicted in FIGS. 2 and 4. The sensor detects whether a board S is fed from the hack 3a into the brush unit and operates the scissors lift 4 to raise the feed table to position the next board to the correct elevation for feeding into the brush unit.

Figure 4:
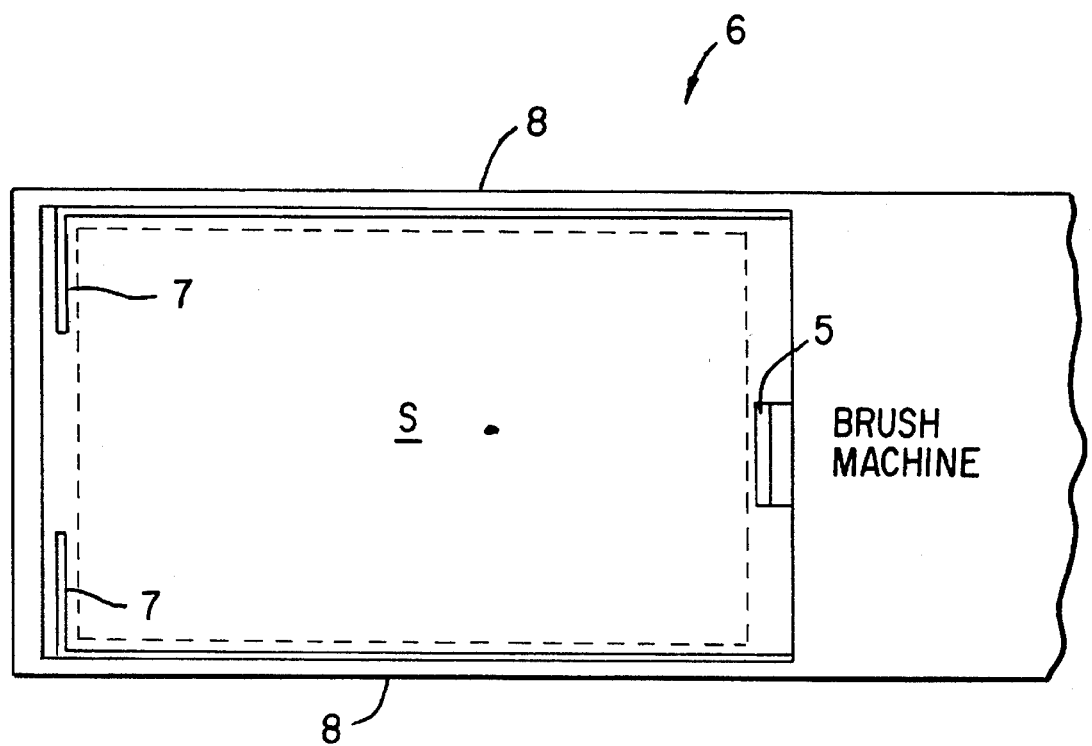
FIG. 4 is a detailed top plan view of the initial feed and brushing apparatus used in the invention.

Each board S is fed into the brush unit by a push feeder 6 as shown in FIGS. 2 and 4. The push feeder apparatus has a pair of arms 7, as shown in Fig. 4, which grips the back-end of each board and pushes it through the brushing stage. The arms 7 are suspended from the carrier 8 which provide for automatic adjustment in elevation to compensate for imperfect stacking of the boards.

The brush unit, which may be a Dieffenbacher Model BUE 5-1650 brushing machine, removes dust and loose foreign matter from the upper and lower surface of each board. The brush unit is connected to a dustcollecting system 9 which removes the foreign matter under vacuum during the brushing process. The push feeder 6 and the forwardly biased brushing action cause each individual board S to feed onto an out-feed table 10 and onto an inclined disc or roller conveyor 11, which passes the individual board S through a spraying system. The disc conveyor is a chain-driven apparatus which provides for even, continuous movement of the board S through the spraying system.

The spraying system, as shown in FIG. 2 comprises a spray hood 12 which mounts and houses several spray nozzles 13 for spraying a softening agent on the board S. A softening agent for use in the process is water mixed with propylene glycol. Plain water or water mixed with trace amounts of denatured alcohol or similar agents may also be used. A collection pan 14 is positioned underneath the disc conveyor 11 to collect over-spray from the hood area. As shown in FIG. 2, a sensor 15 is positioned at the entrance of the hood to trigger the spraying operation as each board S passes under the hood. A wiper element 16 is mounted on the exit area of the hood to ensure even coating of the softening agent on the boards, the softening agent penetrating below the covering paper layer and into the core. The wiper element is adjusted to form the coat into a glaze.

Figure 3:
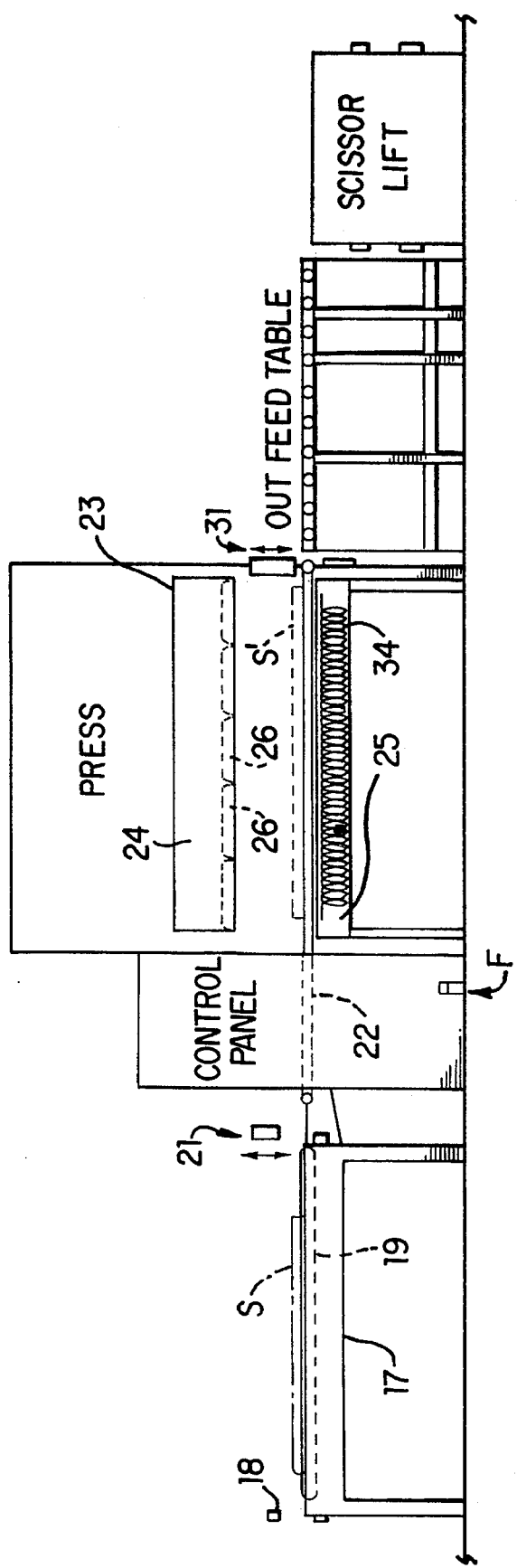
FIG. 3 is a diagrammatic view of the lay-up or press positioning, pressing, press out-feed apparatus used in the invention.

From the disc conveyor 11, each board S is positioned on a lay-up table 17 as shown in FIG. 3 for further preparing the board before introducing the board to the press. As the board S approaches the lay-up table from the disc conveyor 11, a sensor 18, preferably a photoelectric sensor, senses the presence of the board and initiates a conveyor belt 19 on the table 17 to accept the board.

Figure 5:
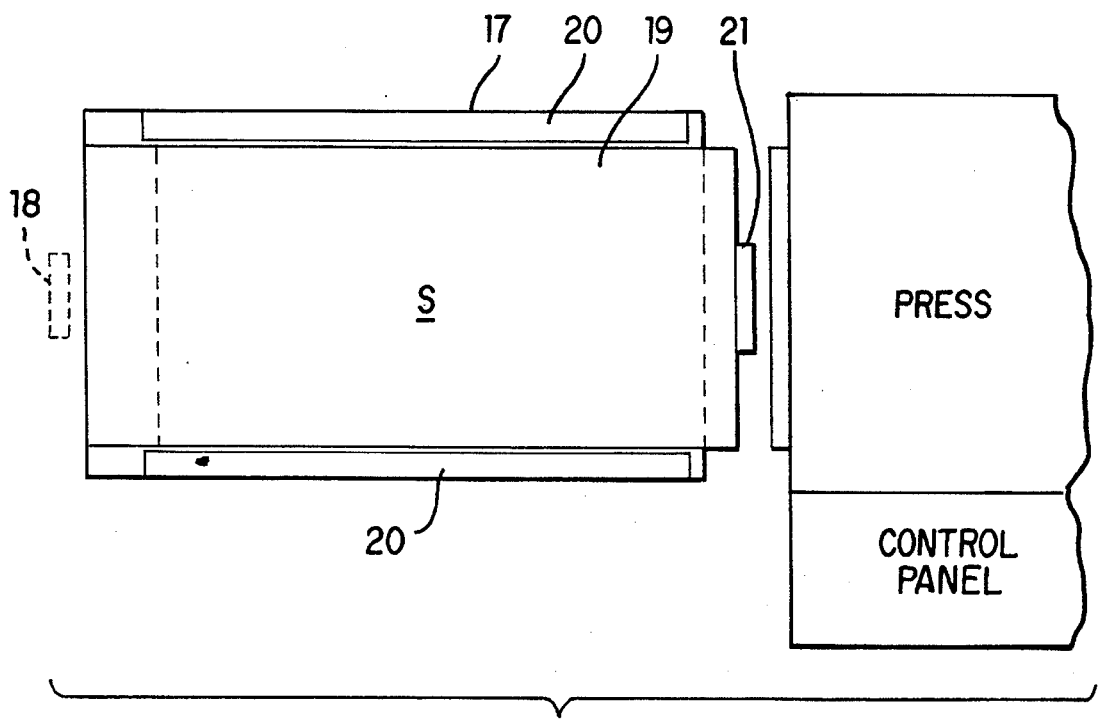
FIG. 5 is a detailed top plan view of lay-up table for the press used in the invention.

Side rails 20 and a movable backstop 21, as shown in FIGS. 3 and 5, position the board S to be fed onto the press belt 22. An aluminum backed wood veneer that has been pre-treated on the aluminum side with a diluted adhesive mixture is manually placed on the glazed side of the board. Specifically, the aluminum backed veneer sheets are placed with the aluminum side facing up on a separate lay-up table (not shown). The aluminum side is then coated with a mixture of approximately 70–80% adhesive such as Weldbond® and 20–30% liquid softening agent. Weldbond® is polyvinyl acetate catalyze made by Blake Ross in Canada. Each aluminum backed wood veneer sheet is then placed on the glazed board with the aluminum side facing the glazed side. The wood side of the veneer is then moistened with water.

Figure 6:
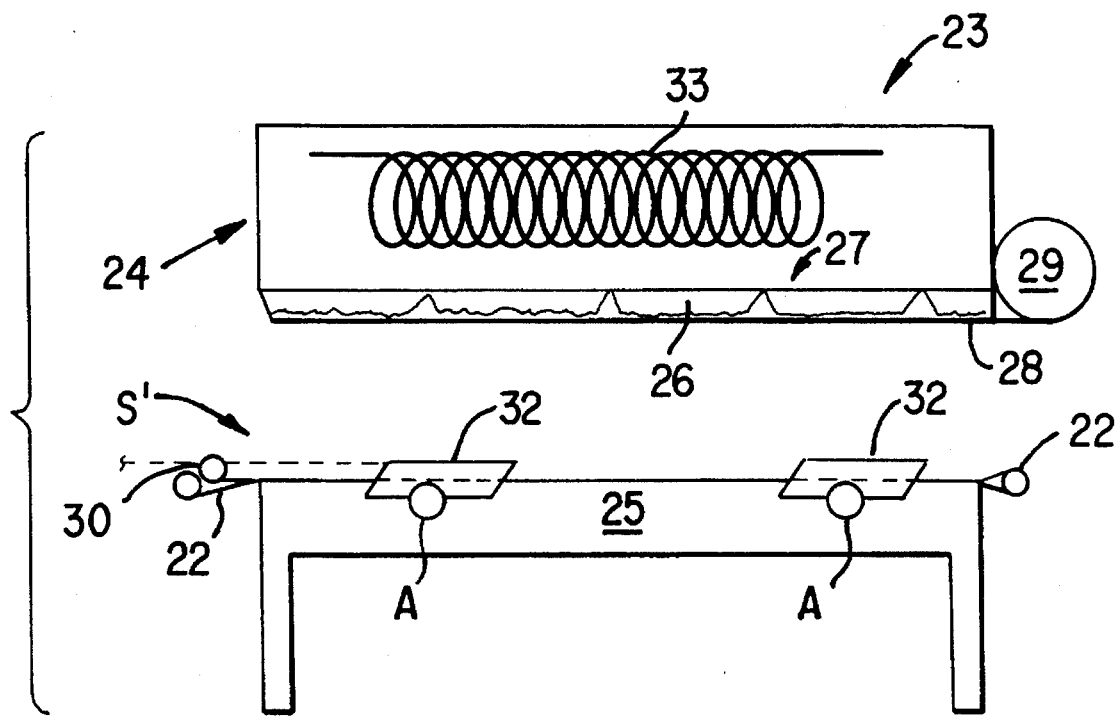
FIG. 6 is a detailed interior side view of the components of the press used in the invention.

The board S', now with the moistened aluminum-backed wood veneer placed on one side of the board, is passed into the press shown in FIG. 3. The press for the board S'may be an OTT short-cycle press Model KD 99. The press includes a top platen 24 and a bottom platen 25. From the top platen 24, die plates 26 may be held to form an upper press plate 23. The die plates 26 are removable and may be of various patterns. The die plates 26 are installed on steel runners 27 as shown in FIG. 6, mounted with bearings 28. This assembly holds the die plates 26 to the top press platen 24 to form the upper press plate 23. The dies are installed through the use of an electric winch 29 mounted on the runners 27 at the out-feed side of the press. Different decorative styles may be pressed into the board by interchanging the die plates. The aluminum dies 26 are configured in the desired pattern. The dies are blocked to control the depth of the pressed pattern.

Each board S'with the aluminum-backed wood veneer is introduced into the press from the lay-up station 17 via the press belt 22 which is made of a wear-resistant mylar material. The speed of the press belt 22 is coordinated by a belt control device (not shown) in the control panel so as to remove the panel from the lay-up belt as it moves and position it properly inside the press.

In the press introduction cycle, the movement of the press belt 22 is initiated by the operation of the lay-up station belt 19 which feeds the material onto the press belt. As shown in FIG. 3, the press belt and lay-up belts are controlled by a foot pedal F at the operator's control panel. The press belt operates at two speeds, initially pulling the board at a higher speed and then slowing to a second, lower speed as the board approaches the correct position for the press operation.

As the board S'approaches the correct position, a backstop 31 moves vertically down to stop the board S'at the correct feed-in position. Air cylinders A, with an alignment apparatus 32 on each side of the press, engage the board S'to align it properly within the press. These alignment devices 32 are retracted prior to the press operation. Once the board S'is properly positioned, the upper press plate 23 is allowed to free-fall and is stopped just prior to contact with the board. The press plate 23 with its incorporated dies 26 then approaches the board S'at a slow rate of descent, pressing and heating the aluminumbacked wood veneer and the gypsum board to the desired thickness.

The upper and lower press platens incorporate oil tubes 33 and 34 as illustrated in FIGS. 3 and 6 to pass hot oil through those elements. The upper press platen 24 is heated by the oil-. By heat transfer from the platen to the dies 26, the dies are heated to the proper temperature. The hot oil in tubes 34 heats the lower press platen 25.

Heat is transferred from the die to the drywall during the pressing operation. The heat introduced into the wood veneer and the board causes the moisture in the wood veneer and the adhesive-softening agent mixture to evaporate into a steam-like vapor. The steam-like vapor permits the wood to stretch, i.e., become elastic. The steam-like vapor also seeps through the paper and into the gypsum core. This heating operation provides the required elasticity to the wood veneer and the paper coating and the required plasticity to the gypsum core, allowing the dies to press into and compress the board S'without damaging or breaking the wood veneer and tearing the paper or destroying the structural integrity of the gypsum board. The aluminum foil backing provides an elastic support for preventing or minimizing the wood veneer from cracking or breaking.

When the press cycle is complete, the upper press plate is removed. The backstop 31, which was used to positioned the board S', is drawn away with the lifting of the press plate 23. At this time, the mylar press belt 22 is initiated again, moving the board S'out of the press and onto an out-feed table. From the out-feed table, the board S'is transferred to a scissor lift, which is lowered by the operator after each pressing operation, so that a next board may be positioned on the lift. This operation is continued until a hack is formed. The completed hack may be removed by a forklift and transferred to the cutting or sizing operation.

When a die with a 3/16 inch press pattern is used, the standard pressing time for the pressing operation is approximately 45 seconds for the standard material described above. The standard press pressure exerted on the board by the top press plate is approximately 200 psi. The temperature of the heated dies is approximately 180° F.

The present apparatus has adjustment for press pressure, press temperature and the moisture content of the board. These parameters are primarily adjusted on the basis of the paper coating used on the board. Adjustment of the operating parameters can prevent tearing or separating of the wood veneer and the surface paper on the board which may be caused by insufficient stretching. Such an adjustment can also eliminate any delamination of the paper coating from the gypsum substructure.

The delamination of gypsum core from the paper, called bubbling, may be corrected by the reduction of the moisture content on the board surface by lowering the press time or press temperature, or by an adjustment of both of these parameters. After the press operation, the boards must be allowed to cool prior to any subsequent handling. The boards may then be cut and stacked.

The wood veneer laminated gypsum board S' is formed by spraying or applying a mixture of 70–80% adhesive such as Weldbond® diluted with 20–30% liquid softening agent, which may include water or water mixed with other materials, on the aluminum side of the aluminum-backed wood veneer. The paper or paper-like outer covering is cleaned and lightly sprayed or coated with the softening agent at room temperature. The excess softening agent from the outer surface is wiped away to form an even coat or glaze of softening agent.

The coated aluminum-backed wood veneer is placed onto the glazed gypsum board. A liquid such as water is applied to the wood veneer to moisten and soften the wood. The veneer is provided with slits or perforations to allow the release of any trapped air between the veneer and the gypsum face. The wood veneer and the gypsum board is pressed with the application of heat at approximately 180°F. for about 45 seconds to bond the wood veneer to the face of the gypsum board and to deboss decorative patterns into the board.

Excellent results have been achieved by this process, with 100% adhesion of the wood veneer to the gypsum outer paper as well as a very clean and concise pattern in the debossed veneer without tearing or bubbling. Specifically, when the softening agent which penetrates through the outer covering paper into the gypsum core is heated to a vapor with the heated press, the outer paper becomes elastic and the gypsum core becomes plastic. The vaporized softening agent thus promotes stretching of the face paper during the debossing of decorative patterns into the board. The vaporization of the elasticity-promoting softening agent inside the gypsum board permits decorative patterns to be impressed or debossed into the gypsum substructure without impairing the integrity of the board.

Similarly, the water applied to the wood veneer soaks through the wood to allow the wood to become elastic and thus promotes stretching during the debossing process, while the aluminum backing further prevents the wood from cracking or breaking. The stretching of the wood enables the wood veneer to be debossed with a very clean and concise pattern in the debossed veneer without tearing or bubbling.

The foregoing description is only illustrative of the principle of the present invention. It is to be understood that the present invention is not to be limited to the exact construction as illustrated and described herein. Accordingly, all expedient modifications which may be made within the scope and the spirit of the present invention are encompassed herein. For instance, while an aluminum backing is preferably for backing a wood veneer, other metal foil may be used if necessary.

I claim:

1. A board comprising a flat gypsum core having at least two flat opposed sides, an outer paper covering bonded to at least one of said two sides, a metal foil bonded to said outer paper covering and a wood veneer bonded to said metal foil, wherein decorative designs are debossed into the surface of the board, said board being formed by a process comprising the steps of:

providing a gypsum board having said outer paper covering bonded to said gypsum cora at least on one side of said board;

applying a softening agent to said outer covering of said board to moisten said board;

applying a mixture of adhesive and said softening agent to one side of a wood veneer laminate which has said metal foil bonded thereto;

placing said one side of said wood veneer laminate with said metal foil over said moistened outer covering of said board;

moistening said wood veneer laminate to soften said wood veneer; and simultaneously pressing a decorative pattern into said wood veneer laminate and said board by applying pressure and heat to the exposed outer surface of said wood veneer laminate, whereby said heat and pressure applied to the surface of the wood veneer laminate cause said wood veneer laminate to bond with said gypsum board, and simultaneously form decorative debossed patterns into said wood veneer laminate and into the gypsum board, said heat causing the moistened wood veneer to become elastic and vaporizing said softening agent which penetrates through said outer covering and into said gypsum core to cause said outer covering to become elastic and said gypsum core to become plastic, wherein said metal foil minimizes breaking of the wood during said pressing step.

2. A board according to claim 1, wherein said metal foil is aluminum.

3. A board according to claim 1, wherein said wood veneer laminate and said gypsum board is pressed at a temperature of about 180°F for a period of 45 seconds.

4. A board according to claim 1, wherein said mixture comprises 70–80% adhesive and 20–30% softening agent.

5. A board according to claim 4, wherein said adhesive consists of poly-vinyl acetate catalyze.

6. A board according to claim 1, wherein said wood veneer laminate is provided with air venting means to release any trapped air between said veneer laminate and said outer covering during the pressing step.

7. A board according to claim 6, wherein said air venting means is cuts provided in said wood veneer laminate in sections.

8. A board according to claim 6, wherein said air venting means is at least one slit provided in said wood veneer laminate.

9. A board according to claim 6, wherein said air venting means is perforations provided in said wood veneer.

10. A board according to claim 1, wherein said softening agent comprises water mixed with propylene glycol or water mixed with denatured alcohol or plain water.

11. A laminated board having decorative design debossed into the surface of said board, comprising:

a gypsum material forming a core of said laminated board, the gypsum core having two opposed flat sides;

a paper layer coated on said two opposed flat sides of the core;

a wood veneer laminate bonded to said paper layer on one of said two sides;

decorative designs simultaneously debossed into said wood veneer laminate, through said paper, and into said gypsum core, wherein said wood laminate comprises a wood veneer bonded to a metal foil, said metal foil preventing wood from cracking or breaking during debossment of said decorative design.

12. A laminated board according to claim 11, wherein said metal foil is aluminum.

13. A laminated board according to claim 13, wherein said wood veneer laminate is provided with air venting means to release any trapped air between said veneer laminate and said outer covering during debossing.

14. A laminated board according to claim 13, wherein said air venting means is cuts provided in said wood veneer laminate in sections.

15. A laminated board according to claim 13, wherein said air venting means is at least one slit provided in said wood veneer laminate.

16. A laminated board according to claim 13, wherein said air venting means is perforations provided in said wood veneer.

* * * * *